US012767044B2

(12) United States Patent
Cong et al.

(10) Patent No.: US 12,767,044 B2
(45) Date of Patent: Oct. 20, 2026

(54) MOTOR VEHICLE CABIN SENSING SYSTEM

(71) Applicant: Continental Automotive Technologies GmbH, Hannover (DE)

(72) Inventors: Weiquan Cong, Singapore (SG); Christian Mindescu, Langen (DE); Nathalie Wustmann, Hösbach (DE); Keng Aik Alan Boo, Singapore (SG)

(73) Assignee: Continental Automotive Technologies GmbH, Hannover (DE)

( * ) Notice: Subject to any disclaimer, the term of this patent is extended or adjusted under 35 U.S.C. 154(b) by 251 days.

(21) Appl. No.: 18/143,734

(22) Filed: May 5, 2023

(65) Prior Publication Data

US 2023/0356654 A1 Nov. 9, 2023

(30) Foreign Application Priority Data

May 5, 2022 (GB) ...................................... 2206528

(51) Int. Cl.
*B60Q 3/72* (2017.01)
*B60Q 3/60* (2017.01)
(Continued)

(52) U.S. Cl.
CPC ................. *B60Q 3/72* (2017.02); *B60Q 3/60* (2017.02); *B60Q 3/74* (2017.02); *H04N 23/21* (2023.01);
(Continued)

(58) Field of Classification Search
None
See application file for complete search history.

(56) References Cited

U.S. PATENT DOCUMENTS 7,205,527 B2 * 4/2007 Li ............................ G01S 17/04 280/735
8,055,023 B2 * 11/2011 Goto ..................... B60R 25/302 382/104
(Continued)

FOREIGN PATENT DOCUMENTS

CN 108571703 9/2018
CN 112379567 2/2021
(Continued)

OTHER PUBLICATIONS

Espacenet downloaded translation of RU-2607822-C1 Specification / Description on Mar. 7, 2025. (Year: 2017).*
(Continued)

*Primary Examiner* — Tyler W. Sullivan
(74) *Attorney, Agent, or Firm* — COZEN O'CONNOR

(57) ABSTRACT

A motor vehicle cabin sensing system is disclosed. The system comprises an image sensor, an illumination source and an illumination lens array. The image sensor is operable to capture one or more images, the image sensor having a field of view of a motor vehicle cabin. Preferably, the image sensor is operable to capture images in a near infrared wavelength. The illumination source is operable to transmit light rays towards the motor vehicle cabin. The illumination lens array is operable to diffuse the light rays emitting from the illumination source to one or more photoreceptor cells of a retina such that a radiant intensity of a red glow effect detected by the retina is a reduction of 10 to 100 times or 0% to 50% of a radiant intensity of the illumination source. A method is also disclosed.

19 Claims, 5 Drawing Sheets

200

(51) Int. Cl.

| | |
|---|---|
| ***B60Q 3/74*** | (2017.01) |
| ***G02B 3/00*** | (2006.01) |
| ***H04N 23/21*** | (2023.01) |
| ***H04N 23/56*** | (2023.01) |
| ***H04N 23/71*** | (2023.01) |

(52) U.S. Cl.

CPC ............ *H04N 23/56* (2023.01); *H04N 23/71* (2023.01); *G02B 3/0056* (2013.01)

(56) References Cited

U.S. PATENT DOCUMENTS

| | | | | |
|---|---|---|---|---|
| 8,143,563 | B2 * | 3/2012 | Broude | B60J 3/04 345/7 |
| 2005/0121892 | A1 | 6/2005 | Li et al. | |
| 2010/0045790 | A1 | 2/2010 | Lynam et al. | |
| 2015/0186737 | A1 | 7/2015 | Omi et al. | |
| 2016/0164261 | A1 | 6/2016 | Warren | |
| 2017/0297490 | A1 * | 10/2017 | Lynam | B60D 1/36 |
| 2018/0099612 | A1 | 4/2018 | Weller et al. | |
| 2019/0268068 | A1 | 8/2019 | Dacha et al. | |
| 2020/0257128 | A1 | 8/2020 | Sakai et al. | |
| 2021/0191005 | A1 | 6/2021 | Fancsali et al. | |
| 2021/0299879 | A1 * | 9/2021 | Pinter | B25J 9/1697 |
| 2022/0116517 | A1 | 4/2022 | Chng et al. | |
| 2022/0231482 | A1 * | 7/2022 | Smits | B60Q 3/60 |
| 2024/0409032 | A1 * | 12/2024 | Sobecki | G06V 20/597 |
| 2025/0222857 | A1 * | 7/2025 | Rodriguez Barros | B60Q 1/2665 |

FOREIGN PATENT DOCUMENTS

| | | | | |
|---|---|---|---|---|
| CN | 114155592 | | 3/2022 | |
| CN | 114815451 | | 7/2022 | |
| EP | 4030568 | A1 | 7/2022 | |
| GB | 2602966 | | 7/2022 | |
| JP | 2007001417 | | 1/2007 | |
| JP | 2013200474 | | 10/2013 | |
| JP | 2017097058 | | 6/2017 | |
| JP | 2017130919 | A | 7/2017 | |
| JP | 2018159931 | | 10/2018 | |
| JP | 2019087934 | A | 6/2019 | |
| RU | 2607822 | C1 * | 1/2017 | |
| WO | 2013114891 | | 8/2013 | |
| WO | WO-2019119025 | A1 * | 6/2019 | G01B 11/22 |

OTHER PUBLICATIONS

European Examination Report dated Oct. 20, 2023 corresponding to European Application No. 23158839.3.

Zhou et al., "Research on VCSEL transmitter modules for intelligent driving" Proceedings of the Spie, Spie, US vol. 11891, Oct. 9, 2021.

Search Report dated Nov. 1, 2022 from corresponding GB patent application No. 2206528.8.

Office Action dated Mar. 6, 2024 from corresponding Japanese patent application No. 2023-049967.

Helen Norman "In-Vehicle Sensing Using Near-Infrared Light for Driver and Occupant Monitoring: Interview with Matt Scholz, Automotive Business Leader, Radiant Vision Systems", Automotive Interiors World, pp. 1-21, Feb. 2, 2021.

* cited by examiner

MOTOR VEHICLE CABIN SENSING SYSTEM

CROSS REFERENCE TO RELATED APPLICATION

This U.S. patent application claims the benefit of GB patent application No. 2206528.8, filed May 5, 2022, which is hereby incorporated by reference.

TECHNICAL FIELD

This disclosure relates to a motor vehicle, in particular cabin sensing system for a motor vehicle.

BACKGROUND

Automotive industry experiences a trend of implementing driver monitoring systems (DMS) to ensure safety of drivers. The most common function of DMS is to monitor status of driver, to determine whether the driver is fatigue, drunk or in a state fit for operating a motor vehicle, to achieve driver's and road users' safety.

Designing an effective DMS is often challenging, as more and more information is required to determine facial characteristics of drivers. One of the methods to counter this problem is to capture images of the driver within an infrared wavelength to obtain images of the driver for facial recognition image processing. A typical working IR wavelength is invisible to human's eyes.

Nonetheless, under certain conditions, for example at low ambient lighting condition, such as an interior environment of a passenger cabin, light rays emitting within IR wavelength may be detected by a human's eye and the light rays will be perceived as a red glow, also known as a red glow effect. This red glow of light may cause distraction to a driver operating the motor vehicle, thus causing discomfort, and compromising safety of the driver.

There is therefore a need to provide a motor vehicle sensing system that overcomes, or at least ameliorates, the problems described above. Furthermore, other desirable features and characteristics will become apparent from the subsequent detailed description and the appended claims, taking in conjunction with the accompanying drawings and this background of the disclosure.

SUMMARY

A purpose of this disclosure is to ameliorate the problem of red glow effect being detected by human's eye for safety by providing the subject-matter of the independent claims.

The objective of this disclosure is solved by a motor vehicle cabin sensing system, which comprises an image sensor operable to capture one or more images, the image sensor having a field of view of a motor vehicle cabin, an illumination source operable to transmit light rays towards the motor vehicle cabin, and an illumination lens array operable to diffuse the light rays emitting from the illumination source towards the motor vehicle cabin. The illumination lens array further comprises two or more single lens element, each of the two or more single lens element operable to diffuse the light rays emitting from the illumination source to one or more photoreceptor cells of a retina, wherein each of the two or more single lens element is operable to detect a radiant intensity representing a red glow, and wherein the radiant intensity is 0% to 50% of the light rays emitting from the illumination source.

The above-described aspect of this disclosure yields a motor vehicle cabin sensing system which solves the problem of red glow effect being perceived by a driver, which causes distraction. The problem of red glow effect is solved by reducing a radiant intensity of the red glow detected by one or more photoreceptor cells of a human's eyes by 10 to 100 times. For example, the radiant intensity is reduced to 0% to 50% of the light rays emitting from the illumination source, in response to the diffusing of light rays using an illumination lens array. For example, the radiant intensity is reduced to 0.1% to 30% of the light rays emitting from the illumination source, and even more preferably, the radiant intensity is reduced to 1% to 10% of the light rays emitting from the illumination source.

In an embodiment of a system as described above, the illumination lens array is positioned forward of the illumination source.

The above aspect of this disclosure is to provide an optical way to diffuse light rays emitting from the illumination source such that the light rays transmitting towards the motor vehicle cabin are incident rays received by one or more photoceptor cells of the retina of a human's eye.

In an embodiment of a system as described above, the illumination lens array comprises two or more single lens elements integrated on a single lens sheet.

The above aspect of this disclosure is to allow flexibility in design of the illumination lens array, such that each single lens element may be resized according to system requirements. For example, the total number of lens element depends on the overall lens array size. Nonetheless, there is no constraint as to the number of lens. However, a higher number of lens element will yield an improved or better performance in terms of red glow effect reduction detected by the retina.

In an embodiment of a system as described above, the illumination lens array is a micro lens array.

The above aspect of this disclosure is to provide an alternative solution by replacing the single sheet illumination lens array with a micro lens array. Using micro lens array as the illumination lens array enables distribution of light rays evenly amongst the different lens array, thus achieving significant reduction of a radiant intensity perceived by the one or more photoreceptor cells.

In an embodiment of a system as described above, the illumination lens array is a is a Fresnel lens.

The above aspect of this disclosure is to provide an alternative solution by replacing the illumination lens array with a Fresnel lens array to achieve reduction in thickness of lens array, thereby yielding a much more compact system.

In an embodiment of a system as described above, each of the two or more single lens element further comprises a prism, a diverging lens, or a combination thereof.

The above aspect of this disclosure is to provide lens elements on a single sheet of lens array, to diffuse light rays from the illumination source of the motor vehicle cabin sensing system for diffusing light rays emitting from the illumination source such that only 0% to 50% of a radiant intensity is detected and transmitted through the one or more lens element. For example, the lens array may use a prism, a diverging lens or a combination of both a prism and a diverging lens to yield desired technical results.

In an embodiment of a system as described above, the illumination source comprises a near infrared (NIR) illumination source.

The above aspect of this disclosure is to defines a type of illumination sourced used in the motor vehicle cabin sensing system, to achieve an infrared working wavelength.

In an embodiment of a system as described above, the illumination source is a NIR light emitting diode (LED).

The above aspect of this disclosure is to defines an alternative type of illumination sourced used in the motor vehicle cabin sensing system, to achieve an infrared wavelength.

In an embodiment of a system as described above, the illumination source is a vertical-cavity surface-emitting laser (VCSEL).

The above aspect of this disclosure is to defines an alternative type of illumination sourced used in the motor vehicle cabin sensing system, to achieve an infrared wavelength.

In an embodiment of a system as described above, the system further comprises a reflective panel.

The above aspect of this disclosure is to yield light efficiency by reducing light leakage. This technical feature is useful for light sources with a wider view angle and addresses problem of light flux leakage from the sides of the illumination lens array caused by wide view angle. An example of a reflective panel may be a flat plate with reflective surface or a flat reflective mirror.

In an embodiment of a system as described above the reflective panel further comprises a first end and a second end, wherein a first end of the reflective panel is displaced adjacent to the illumination light source, and a second end of the reflective panel is displaced adjacent to the illumination lens array.

The above aspect of this disclosure is to yield an arrangement of the reflective panel which addresses problem of light flux leakage from the sides of the illumination lens array caused by wide view angle.

In an embodiment of a system as described above, the image sensor is operable within a near infrared (NIR) wavelength.

The above aspect of this disclosure is to define a type of image sensor suitable for implementation in a motor vehicle cabin sensing system as disclosed herein. Preferably, a basic image sensor is expected to work in NIR wavelength for driver monitoring system or cabin monitoring system without departing from the main inventive concept of this disclosure.

In an embodiment of a system as described above, the illumination lens array has a dimension of preferably 0.1 cm to 10 cm (1 mm-100 mm), more preferably 5 cm to 9 cm (50 mm to 90 mm) and even more preferably 0.1 to 0.2 cm (1 mm to 2 mm).

The above aspect of this disclosure is to provide a preferred dimension of the illumination lens array suitable for driver monitoring or cabin sensing systems. For example, the maximum size shall not exceed 5 cm to 10 cm to ensure such motor vehicle cabin sensing systems are able to support eye gaze tracking purposes. However, the main concept of the configuration of a dimension of the illumination lens array is to match the field of illumination of the illumination source at a distance, i.e., from an imaging module of the system to a position of human's eyes. Therefore, depending on distance between driver and illumination source, the minimum size of the illumination lens array may be higher, for example 2 mm in diameter which may match the size of light source but may vary higher or smaller in size, without departing from the main inventive concept.

In an embodiment of a system as described above, the radiant intensity detected by each of the two or more single lens element is preferably 0% to 50% of the light rays emitting from the illumination source, more preferably 0.1% to 30% of the light rays emitting from the illumination source, and even more preferably 1%-10% of the light rays emitting from the illumination source.

The above aspect of this disclosure is to yield a motor vehicle cabin sensing system which solves the problem of red glow effect being perceived by a driver, which causes distraction. For example, the radiant intensity is reduced to 0% to 50% of the light rays emitting from the illumination source, in response to the diffusing of light rays using an illumination lens array. For example, the radiant intensity is reduced to 0.1% to 30% of the light rays emitting from the illumination source, and even more preferably, the radiant intensity is reduced to 1% to 10% of the light rays emitting from the illumination source.

The objective of this disclosure is solved by a method of reducing red glow effect caused by an illumination source emitting light rays from a motor vehicle cabin sensing system, the method comprising capturing, by way of an image sensor, a field of view of a motor vehicle cabin, emitting, by way of an illumination source, light rays towards the motor vehicle cabin, and diffusing, by way of an illumination lens array, the light rays emitting from the illumination source towards the motor vehicle cabin, wherein the illumination array comprising two or more single lens element, wherein in response to the light rays emitting from the illumination source being diffused by the two or more single lens element, detecting, by way of each of the one or more single lens element, a radiant intensity representing a red glow, wherein the radiant intensity is 0% to 50% of the light rays emitting from the illumination source.

The above-described aspect of this disclosure yields a method which solves the problem of red glow effect being perceived by a driver caused by illumination from a motor vehicle cabin sensing system. The problem of red glow effect is solved by reducing a radiant intensity of the red glow detected by one or more photoreceptor cells of a human's eyes by 10 to 100 times. For example, the radiant intensity is reduced to 0% to 50% of the light rays emitting from the illumination source, in response to the diffusing of light rays using an illumination lens array. For example, the radiant intensity is reduced to 0.1% to 30% of the light rays emitting from the illumination source, and even more preferably, the radiant intensity is reduced to 1% to 10% of the light rays emitting from the illumination source.

BRIEF DESCRIPTION OF DRAWINGS

Other objects and aspects of this disclosure will become apparent from the following description of embodiments with reference to the accompanying drawings in which.

In various embodiments described by reference to the above figures, like reference signs refer to like components in several perspective views and/or configurations.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description. It is the intent of this disclosure to present a motor vehicle cabin sensing system and method which is operable to reduce a radiant intensity of red glow effect received by a retina, by 0% to 50% of a radiant intensity of the illumination source used in the system disclosed.

Figure 1:
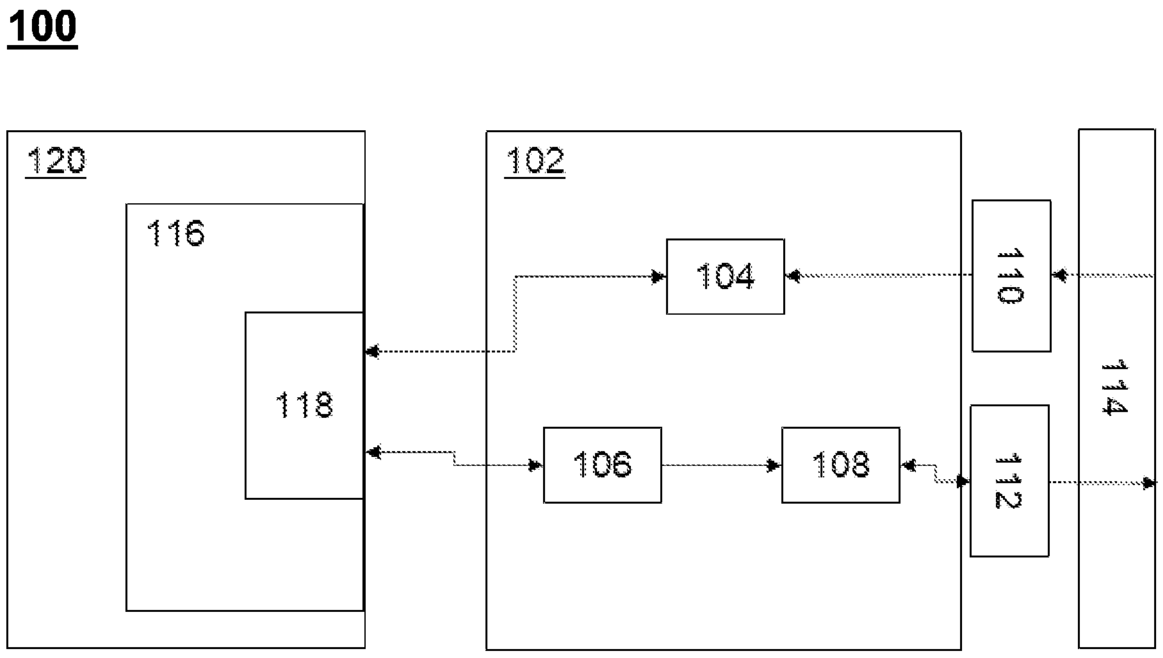
FIG. 1. shows a system block diagram in accordance an embodiment of this disclosure.

FIG. 1 of the accompanying drawings, shows a system block diagram 100 in accordance an embodiment of this disclosure. The system 100 includes an image module 102 in electronic communication with a host controller 120. The image module 102 further comprises an image sensor 104, a driver circuit 106 and an illumination source 108. The image sensor 104 is operable to capture images. The image sensor 104 has a field of view (FOV) directed towards a motor vehicle cabin. The illumination source 108 emits light rays towards the motor vehicle cabin, such that images may be captured. The system 100 further includes an illumination lens array 112, operable to diffusing the light rays from the illumination source 108 towards the motor vehicle cabin. Specifically, the illumination lens array 112 is operable to diffuse the light rays emitting from the illumination source 108 to one or more photoreceptor cells of a retina of a user, such that a radiant intensity of a red glow effect detected by the retina is 0% to 50% of a radiant intensity of the illumination source 108. Optionally, the system 100 may include image sensor lens 110 and cover 114 for the entire system 100 such that the system 100 is hidden from view of a user sitting within the motor vehicle cabin. A main advantage of the aforesaid configuration is to achieve a reduction of a radiant intensity of the red glow detected by a retina of a human's eyes 0% to 50% of a radiant intensity of the illumination source 108 used in the motor vehicle cabin sensing system 100 by using the illumination lens array 112.

For clarity and brevity, the host controller 120 include a processing unit 116 with a set of instructions stored thereon to execute functions of the system 100 and may optionally include an analyser module 118 for processing images captured by the image sensor 104. It shall be understood by a skilled practitioner the aforesaid features of the host controller 120 is a complementary feature which enhances the overall system 100 and removal of host controller 120 does not affect the main inventive concept of this disclosure.

Figure 2:
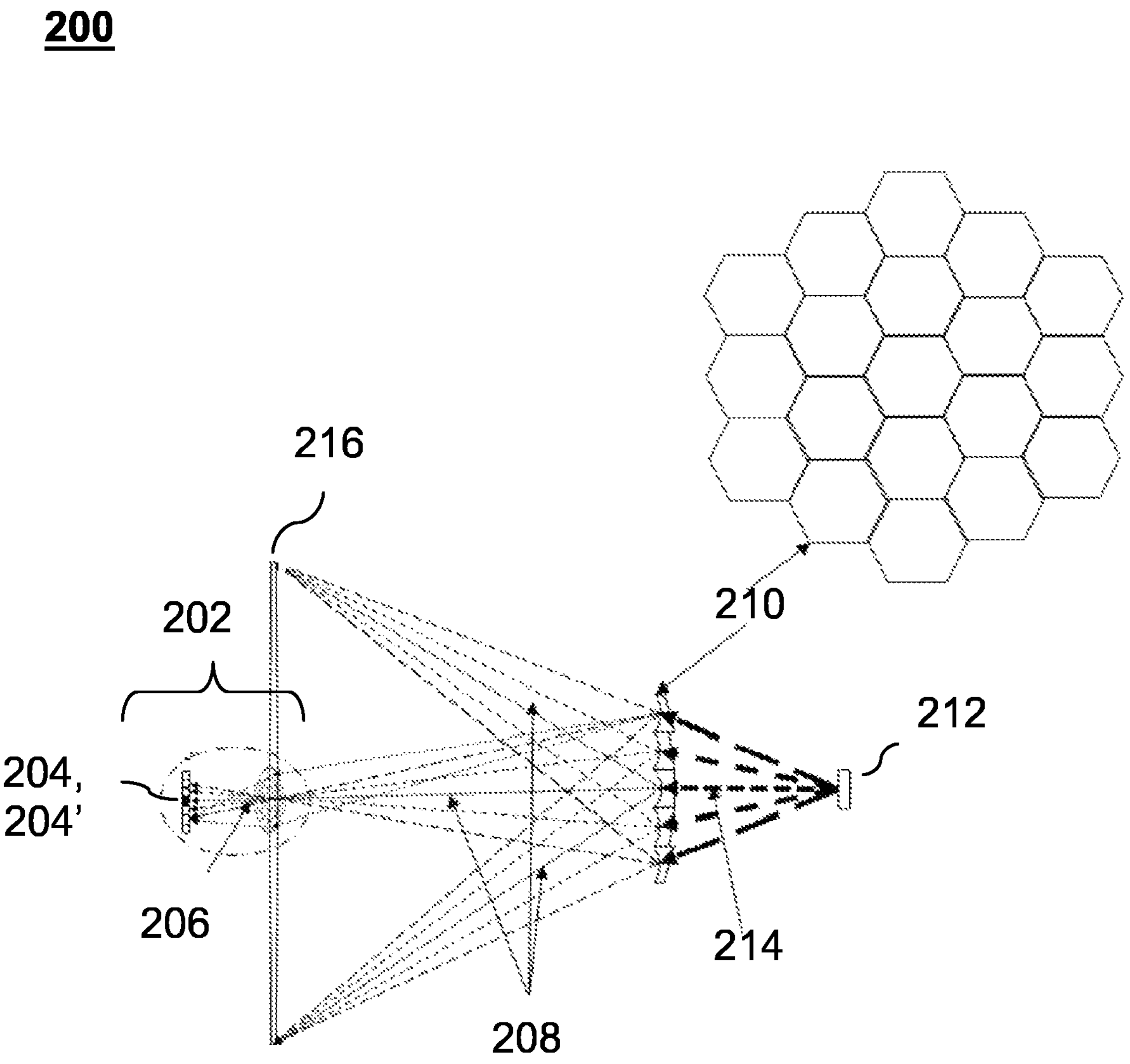
FIG. 2. shows an optical arrangement in accordance an embodiment of this disclosure.

FIG. 2. shows an optical arrangement 200 in accordance an embodiment of this disclosure. As shown in FIG. 2 is a retina 202 having one or more photoceptor cells 204, 204' and an eye lens 206, compositions of which represents a human's eye. Forward of the retina 202 is an object plane 216. An illumination source 212 like illumination source 108 shown in FIG. 1, system 100 is shown here, emitting light rays towards the retina 202. An illumination lens array 210 is arranged forward of the illumination source 212, where the illumination lens array 210 is operable to diffuse the light rays emitting from the illumination source 212 towards the motor vehicle cabin. For example, the illumination lens array 210 is a micro lens array operable to diffuse the light rays emitting from the illumination source 212 to one or more photoreceptor cells 204, 204' of a retina 202 such that a radiant intensity of a red glow detected by the retina 202, or each of the one or more photoreceptor cells 204, 204' is 0% to 50% of a radiant intensity of the illumination source 212. The light rays emitting from illumination source 212 are high density incident rays 214. Once the high-density incident rays 214 transmit through the illumination lens array 210, the high-density incident rays 214 is distributed and thus considered diffused lower density light rays 208. Due to this distribution and/or diffusion of light rays emitted from the illumination source 212, the diffused lower density light rays 208 received by one or more photoceptor cells 204, 204' is a radiant intensity of a red glow having 0% to 50% of a radiant intensity of the illumination source 212. In this embodiment shown in FIG. 2, the illumination array 210 comprises multiple lens elements, each of the lens element is formed in a hexagon shape, but not limited thereto. Other suitable shapes, for example circle or square, may also be used as part of the illumination lens array design.

Figure 3:
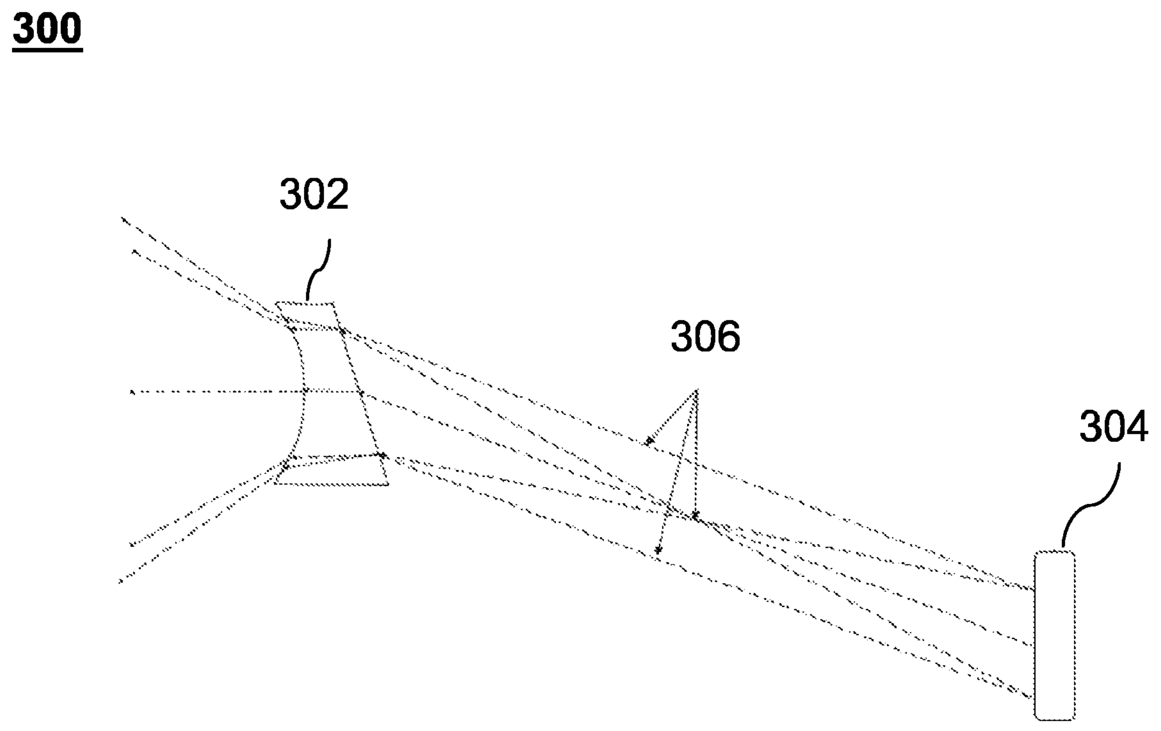
FIG. 3. shows an optical arrangement in accordance an embodiment of this disclosure.

FIG. 3. shows an optical arrangement 300 in accordance an embodiment of this disclosure. An illumination source 304 is shown emitting light rays and in particular incident light rays 306 towards a single element of illumination lens array 302. In this exemplary embodiment, the illumination lens array 302 is a single lens element design, which may comprise a combination of prism and diverging lens. For example, the illumination lens array 302 has a dimension compatible with a size of the illumination source 304, or smaller than the illumination source to achieve better reduction of red glow received by the photoreceptor cells. The total number of lens elements depends on the single element size and the overall lens array size. There is no constraint as to a preferred number of lens elements. Nonetheless, a higher number would yield a better performance in terms of reduction of the red glow effect.

Figure 4:
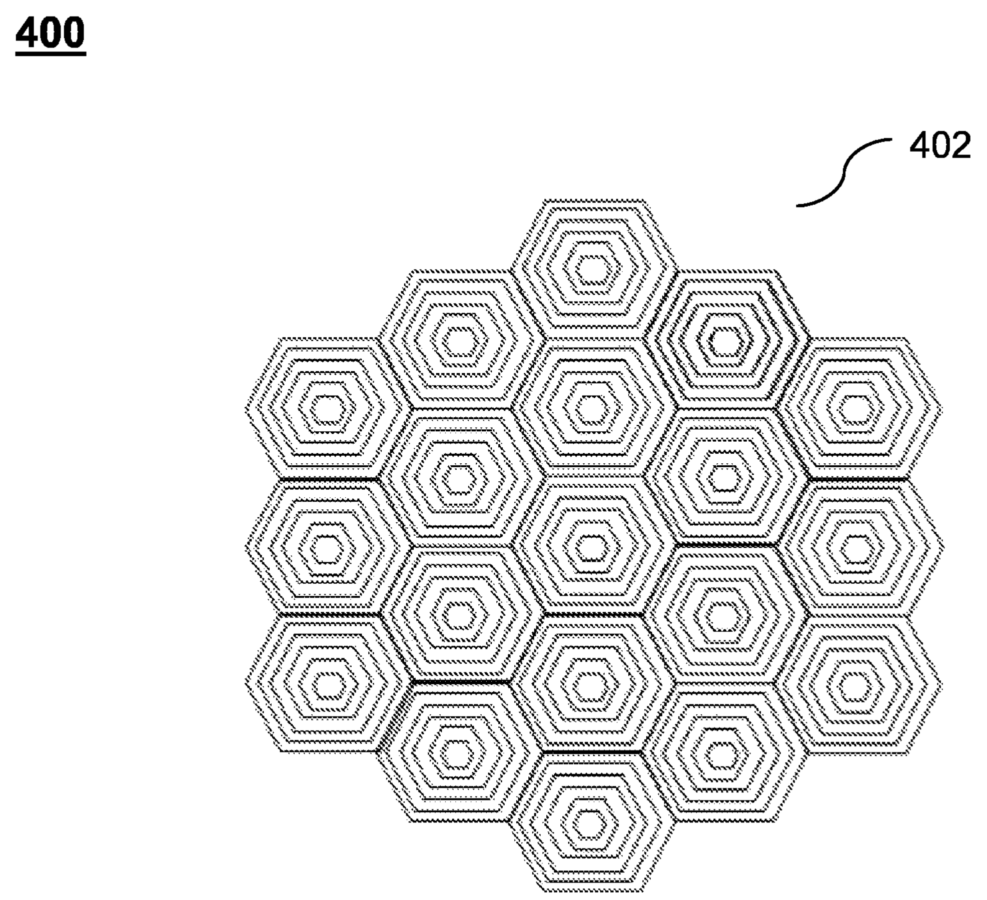
FIG. 4. shows an optical arrangement in accordance an embodiment of this disclosure.

FIG. 4. shows an optical arrangement 400 in accordance an embodiment of this disclosure. More specifically, optical element 400 is an illumination lens array 402 based on Fresnel lens. As illustrated on FIG. 4, each lens is in a hexagon shape, but shall not be limited thereto. Using an illumination lens array 402 based on Fresnel lens significantly reduces a thickness of the illumination lens array in system 100.

Figure 5:
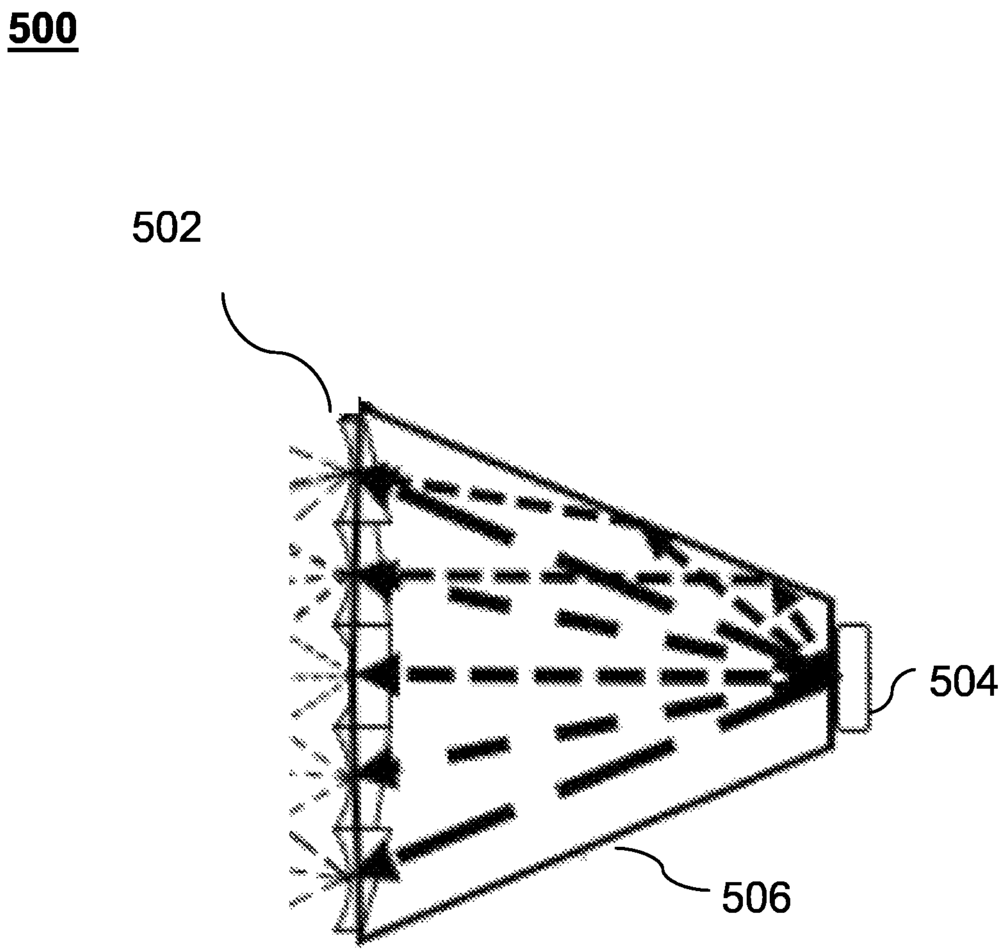
FIG. 5. shows an optical arrangement in accordance an embodiment of this disclosure.

FIG. 5. shows an optical arrangement 500 in accordance an embodiment of this disclosure. An illumination lens array 502 is placed forward of an illumination source 504, with a reflective panel 506 placed therebetween such that a first end of the reflective panel is displaced adjacent to the illumination light source and a second end of the reflective panel is displaced adjacent to the illumination lens array. An advantage of this configuration is to achieve light efficiency by reducing light leakage between the illumination lens array 502 and the illumination source 504. This configuration is helpful to addresses problem of light flux leakage from the sides of the illumination lens array caused by wide view angle. A suitable reflective panel may be a flat plate with reflective surface or a flat reflective mirror.

In the embodiments discussed herein, the total size of illumination lens array range for cabin sensing systems such as driver's monitoring application or cabin monitoring applications, the size limit shall not to exceed e.g., 5-10 cm in diameter. The aforesaid dimension is for example to support eye gaze tracking functions. Apart from the aforesaid consideration, the dimension of the illumination lens array is based upon matching of the field of illumination of the illumination source at a distance. The minimum size shall be higher than the size of illumination source, e.g., typically –2 mm in diameter, but it is also possible to be of a different size, either bigger or smaller. Accordingly, the illumination lens array has a dimension of preferably 0.1 cm to 10 cm (1 mm-100 mm), more preferably 5 cm to 9 cm (50 mm to 90 mm) and even more preferably 0.1 to 0.2 cm (1 mm to 2 mm).

In all the above embodiments, suitable types of illumination sources may include any form of light sources suitable for working in an infrared wavelength range, for example a near infrared (NIR) illumination source, a NIR light emitting diode (LED) or a vertical-cavity surface-emitting laser (VCSEL).

Further, in all of the above embodiments, the radiant intensity detected by each of the two or more single lens element is preferably 0% to 50% of the light rays emitting from the illumination source. More preferably, the radiant intensity may reach as low as substantially zero percent, for example 0.1% to 30% of the light rays emitting from the illumination source and even more preferably 1%-10% of the light rays emitting from the illumination source.

Thus, it may be seen a motor vehicle cabin sensing system and method having an advantage of reducing a radiant intensity of red glow effect received by a retina, by 0% to 50% of a radiant intensity of an illumination source has been provided. While embodiments have been presented in the foregoing detailed description of the disclosure, it should be appreciated that a vast number of variation exist.

It should further be appreciated that the embodiments are only examples, and are not intended to limit the scope, applicability, operation or configuration of the disclosure in any way. Rather, the foregoing detailed description will provide those skilled in the art with a convenient road map for implementing an embodiment of the disclosure, it being understood that various changes may be made in the function and arrangement of elements and method of operation described in the embodiment without departing from the scope of the disclosure as set forth in the appended claims.

The invention claimed is:

1. A motor vehicle cabin sensing system comprising:

an image sensor operable to capture at least one image, the image sensor having a field of view of a motor vehicle cabin;

an illumination source operable to emit near-infrared light rays toward the motor vehicle cabin;

an illumination lens array positioned forward of the illumination source and operable to optically diffuse the light rays emitting from the illumination source toward the motor vehicle cabin; and a cover configured to obscure the motor vehicle cabin sensing system from a view of a user sitting within the motor vehicle cabin;

wherein the illumination lens array comprises a plurality of single lens elements formed on a common lens structure, each single lens element comprising at least one optical element selected from a prism, a diverging lens, or a combination thereof, the single lens elements being configured to distribute the emitted light rays toward at least one photoreceptor cell of a human retina;

wherein diffusion of the emitted light rays by the plurality of single lens elements reduces a radiant intensity of a red-glow component incident on the at least one photoreceptor cell; and wherein the radiant intensity is 0% to 50% of the light rays emitting from the illumination source.

2. The system of claim 1, wherein the illumination lens array is positioned forward of the illumination source.

3. The system of claim 1, wherein the illumination lens array comprises the plurality of single lens elements integrated on a single lens sheet.

4. The system of claim 1, wherein the illumination lens array is a micro lens array.

5. The system of claim 1, wherein the illumination lens array is a Fresnel lens.

6. The system of claim 1, wherein each of the plurality of single lens elements further comprises a diverging lens, or a combination thereof with the prism.

7. The system of claim 1, wherein the illumination source comprises a near infrared illumination source.

8. The system of claim 1, wherein the illumination source is a near infrared (NIR) light emitting diode.

9. The system of claim 1, wherein the illumination source is a vertical-cavity surface-emitting laser.

10. The system of claim 1, wherein the system further comprises a reflective panel.

11. The system of claim 10, wherein the reflective panel further comprises a first end and a second end; and wherein the first end of the reflective panel is displaced adjacent to the illumination light source, and the second end of the reflective panel is displaced adjacent to the illumination lens array.

12. The system of claim 1, wherein the image sensor is operable within a near infrared wavelength.

13. The system according to claim 1, wherein the illumination lens array has a dimension of 0.1 cm to 10 cm (1 mm-100 mm).

14. The system according to claim 1, wherein diffusion by each of the plurality of single lens element reduces the radiant intensity of the red-glow component incident on the at least one photoreceptor cell to 0% to 50% of the light rays emitting from the illumination source.

15. A method of reducing red glow effect caused by an illumination source emitting light rays towards a motor vehicle cabin sensing system, the method comprising:

capturing, via an image sensor, a field of view of a motor vehicle cabin;

emitting, via an illumination source, near-infrared light rays towards the motor vehicle cabin; and diffusing, via an illumination lens array, the light rays emitting from the illumination source towards the motor vehicle cabin, the illumination array comprising a plurality of single lens elements formed on a common lens structure, each single lens element, each single lens element comprising at least one optical element selected from a prism, a diverging lens, or a combination thereof;

wherein diffusion of the light rays by the plurality of single lens elements reduces a radiant intensity of a red-glow component incident on at least one photoreceptor cell of a human retina;

wherein the radiant intensity is 0% to 50% of the light rays emitting from the illumination source; and wherein a cover is configured to obscure the motor vehicle cabin sensing system from a view of a user sitting within the motor vehicle cabin.

16. The system according to claim 13, wherein the illumination lens array has a dimension of 5 cm to 9 cm (50 mm to 90 mm).

17. The system according to claim 16, wherein the illumination lens array has a dimension of 0.1 to 0.2 cm (1 mm to 2 mm).

18. The system according to claim 1, wherein diffusion by the plurality of single lens elements reduces the radiant intensity of the red-glow component incident on at least one photoreceptor cell of a human retina to 0.1% to 30% of the light rays emitting from the illumination source.

19. The system according to claim 1, wherein diffusion by the plurality of single lens elements reduces the radiant intensity of the red-glow component incident on at least one photoreceptor cell of a human retina to 1%-10% of the light rays emitting from the illumination source.

* * * * *